United States Patent
Yan et al.

(10) Patent No.: US 12,438,602 B2
(45) Date of Patent: Oct. 7, 2025

(54) NTN HD-FDD NPDCCH MONITORING ENHANCEMENT

(71) Applicant: Lenovo (Beijing) Ltd., Beijing (CN)

(72) Inventors: Zhi Yan, Xicheng District (CN); Hongmei Liu, Changping District (CN); Yuantao Zhang, Dongcheng District (CN); Yingying Li, Haidian District (CN); Haiming Wang, Xicheng District (CN)

(73) Assignee: Lenovo (Beijing) Ltd., Beijing (CN)

( * ) Notice: Subject to any disclaimer, the term of this patent is extended or adjusted under 35 U.S.C. 154(b) by 269 days.

(21) Appl. No.: 17/913,794

(22) PCT Filed: Nov. 30, 2020

(86) PCT No.: PCT/CN2020/132709
§ 371 (c)(1),
(2) Date: Sep. 22, 2022

(87) PCT Pub. No.: WO2021/189924
PCT Pub. Date: Sep. 30, 2021

(65) Prior Publication Data
US 2024/0205910 A1 Jun. 20, 2024

(30) Foreign Application Priority Data
Mar. 27, 2020 (WO) ............... PCT/CN2020/081670

(51) Int. Cl.
*H04B 7/185* (2006.01)
*H04W 52/02* (2009.01)
(Continued)

(52) U.S. Cl.
CPC .... *H04B 7/18513* (2013.01); *H04W 52/0216* (2013.01); *H04W 72/0446* (2013.01); *H04W 72/1263* (2013.01)

(58) Field of Classification Search
CPC ..... H04L 5/0055; H04L 5/0098; H04L 5/001; H04W 74/0816; H04W 72/1268; H04W 74/08; H04W 4/70; H04W 72/566
(Continued)

(56) References Cited

U.S. PATENT DOCUMENTS 11,870,732 B2 * 1/2024 Wang .................... H04L 5/0055
2014/0133378 A1 * 5/2014 Wentink ................ H04W 52/48
370/311

(Continued)

FOREIGN PATENT DOCUMENTS

CN 110831027 A 2/2020
WO 2018174805 A1 9/2018

OTHER PUBLICATIONS

202080097845.0 , "Foreign Office Action", US Application No. 202080097845.0, Jul. 16, 2024, 13 pages.
(Continued)

*Primary Examiner* — David Q Nguyen
(74) *Attorney, Agent, or Firm* — FIG. 1 Patents (57) ABSTRACT

Methods and apparatuses for indicating NPDCCH monitoring termination period to the UE in NTN are disclosed. A method comprises receiving a first control signal scheduling one of a first data transmission and a second data reception along with a corresponding feedback message: and terminating monitoring a second control signal in a monitoring termination period that starts from a start time slot and ends at an end time slot.

12 Claims, 7 Drawing Sheets

(51) Int. Cl.
*H04W 72/0446* (2023.01)
*H04W 72/1263* (2023.01)

(58) Field of Classification Search
USPC ................................. 370/328, 329, 330, 331
See application file for complete search history.

(56) References Cited

U.S. PATENT DOCUMENTS

| 2017/0367110 | A1* | 12/2017 | Li ..................... H04W 74/0816 |
| 2019/0297568 | A1* | 9/2019 | Frenger ............. H04W 52/0238 |
| 2019/0313383 | A1 | 10/2019 | Xiong et al. | |
| 2023/0082996 | A1* | 3/2023 | Sarkis .................. H04L 1/1854 370/329 |

OTHER PUBLICATIONS

Ericsson, "DRX enhancements for NTN", 3GPP TSG-RAN WG2 #107, Tdoc R2-1911395, Prague, Czech Republic, Aug. 2019, 6 pages.
Mediatek Inc., "Physical layer control procedure in NR-NTN", 3GPP TSG RAN WG1 Meeting #98, R1-1908014, Prague, Czech Republic, Aug. 2019, 5 pages.
Spreadtrum Communications, "Discussion on cross-slot scheduling for UE power saving", 3GPP TSG RAN WG1 Meeting #97, R1-1906372, Reno, USA [retrieved Dec. 31, 2023]. Retrieved from the Internet <https://www.3gpp.org/ftp/tsg_ran/WG1_RL1/TSGR1_97/Docs>, May 2019, 7 pages.
Ericsson, "FL summary#0 for physical layer control procedures for NTN", 3GPP TSG-RAN WG1 Meeting #98, R1-1909485, Prague, Czech Republic [retrieved Sep. 19, 2022]. Retrieved from the Internet <https://www.3gpp.org/ftp/tsg_ran/WG1_RL1/TSGR1_98/Docs?sortby=namerev>., Aug. 2019, 8 Pages.
Nokia, "Supporting 2 HARQ processes for NB-IoT", 3GPP TSG-RAN WG1 Meeting #86bis, R1-1608888, Lisbon, Portugal [retrieved Sep. 19, 2022]. Retrieved from the Internet <https://www.3gpp.org/ftp/tsg_ran/wg1_rL1/TSGR1_86b/Docs/>., Oct. 2016, 3 Pages.
PCT/CN2020/081670, "International Preliminary Report on Patentability", PCT Application No. PCT/CN2020/081670, Oct. 6, 2022, 5 pages.
PCT/CN2020/081670, "International Search Report and Written Opinion", PCT Application No. PCT/CN2020/081670, Dec. 31, 2020, 6 pages.
PCT/CN2020/132709, "International Preliminary Report on Patentability", PCT Application No. PCT/CN2020/132709, Oct. 6, 2022, 5 pages.
PCT/CN2020/132709, "International Search Report and Written Opinion", PCT Application No. PCT/CN2020/132709, Feb. 9, 2021, 6 pages.
RAN2, "Reply LS on monitoring of partial NPDCCH search spaces", 3GPP TSG RAN WG1 Meeting #90, R1-1712038, Prague, Czech Republic [retrieved Sep. 19, 2022]. Retrieved from the Internet <https://www.3gpp.org/ftp/tsg_ran/WG1_RL1/TSGR1_90/LS/Incoming/>., Aug. 2017, 1 page.
Zte, et al., "Clarification on NPDCCH monitoring for Rel-14 2-HARQ process UE", 3GPP TSG RAN WG1 Meeting #90, R1-1714803, Prague, Czechia [retrieved Sep. 19, 2022]. Retrieved from the internet <https://www.3gpp.org/ftp/TSG_RAN/WG1_RL1/TSGR1_90/Docs/?sortby=namerev>., Aug. 2017, 3 Pages.
20926817.6, "Extended European Search Report", EP Application No. 20926817.6, Nov. 20, 2023, 9 pages.
"Foreign Office Action", Korean Application No. 10-2022-7033641, Jun. 23, 2025, 12 pages.
"Foreign Office Action", EP Application No. 20926817.6, Jul. 30, 2025, 8 pages.
Asia Pacific Telecom, "Discussion on physical layer control procedures for NTN", 3GPP TSG-RAN WG1 Meeting #98-Bis, R1-1910845, Oct. 14, 2019, 3 pages.
NTT Docomo, Inc., "Clarification of PDCCH monitoring when not fully aligned with PDCCH periods", 3GPP TSG-RAN2 Meeting #108, R2-1914482, Nov. 18, 2019, 6 pages.
Oppo, "NTN control procedure for physical layer", 3GPP TSG RAN WG1 #98bis, R1-1910386, Chongqing, China [retrieved Oct. 26, 2022]. Retrieved from the Internet <https://www.3gpp.org/ftp/tsg_ran/WG1_RL1/TSGR1_98b/Docs>., Oct. 2019, 3 Pages.

* cited by examiner

NBIoT legacy

Figure 5

NBIoT in NTN

NTN HD-FDD NPDCCH MONITORING ENHANCEMENT

FIELD

The subject matter disclosed herein generally relates to wireless communications, and more particularly relates to methods and apparatuses for NTN HD-FDD NPDCCH monitoring enhancement.

BACKGROUND

The following abbreviations are herewith defined, at least some of which are referred to in the following description: New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Evolved Node B (eNB), Next Generation Node B (gNB), Uplink (UL), Downlink (DL), Central Processing Unit (CPU), Graphics Processing Unit (GPU), Field Programmable Gate Array (FPGA), Orthogonal Frequency Division Multiplexing (OFDM), Radio Resource Control (RRC), User Entity/Equipment (Mobile Terminal), non-terrestrial networks (NTN), Frequency Time Division Duplex (FDD), Half duplex Frequency Time Division Duplex (HD-FDD), Physical Downlink Control Channel (PDCCH), Internet-of-Things (IoT), Narrowband Internet-of-Things (NB-IoT or NBIoT), NBIoT PDCCH (NPDCCH), Downlink control information (DCI), Physical Uplink Shared Channel (PUSCH), NBIoT PUSCH (NPUSCH), NBIoT PDSCH (NPDSCH), Hybrid Automatic Repeat reQuest (HARQ), timing advance (TA), receiver and transmitter distance (RTD), channel state information (CSI), Random Access Response (RAR), System Information Block (SIB), Radio Resource Control (RRC), Geostationary Earth Orbit (GEO), Low Earth orbit (LEO).

For NBIoT, DCI Format N0 (referred to as DCI N0 hereinafter) is used to trigger a NPUSCH format 1 uplink transmission. When an NBIoT UE receives a DCI N0 on NPDCCH at time slot n (hereinafter, time slot is referred to as subframe), the DCI N0 schedules the NPUSCH format 1 uplink transmission at subframe n+k.

DCI Format N1 or N2 (referred to as DCI N1 or N2 hereinafter) is used to trigger a NPDSCH downlink transmission. When an NBIoT UE receives a DCI N1 or N2 on NPDCCH at subframe n, the DCI N1 or N2 schedules the NPDSCH downlink transmission at subframe n+k.

Figure 1A:
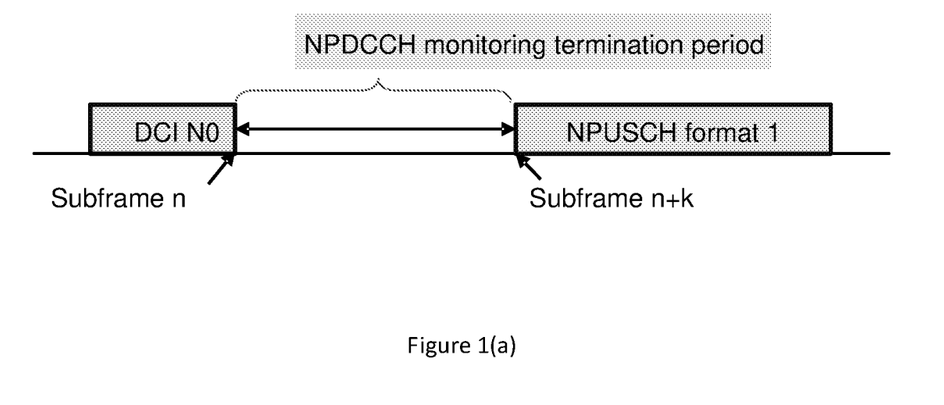
FIG. 1(a) illustrates a legacy NPDCCH monitoring termination period for DCI N0 scheduling NPUSCH transmission when maximum HARQ process number is equal to 1.

When the maximum HARQ process number is equal to 1, the NPDCCH search space constraint is described as follows:

If the NB-IoT UE detects NPDCCH with DCI Format N0 ending in subframe n or receives a NPDSCH carrying a random access response grant ending in subframe n, and if the corresponding NPUSCH format 1 uplink transmission starts from subframe n+k, the UE is not required to monitor NPDCCH in any subframe starting from subframe n+1 to subframe n+k−1. As shown in FIG. 1(a), the UE terminates NPDCCH monitoring from subframe n+1 to subframe n+k−1. In other words, subframe n+1 to subframe n+k−1 is NPDCCH monitoring termination period, during which the UE does not monitor NPDCCH.

It can be seen that the UE terminates monitoring NPDCCH from the next subframe (subframe n+1) of the end subframe of DCI reception (subframe n) to the previous subframe (subframe n+k−1) of the start subframe of uplink (NPUSCH) transmission (subframe n+k). In addition, the UE also terminates monitoring NPDCCH during uplink (NPUSCH) transmission. The uplink (NPUSCH) transmission subframes are known to UE and eNB.

Figure 1B:
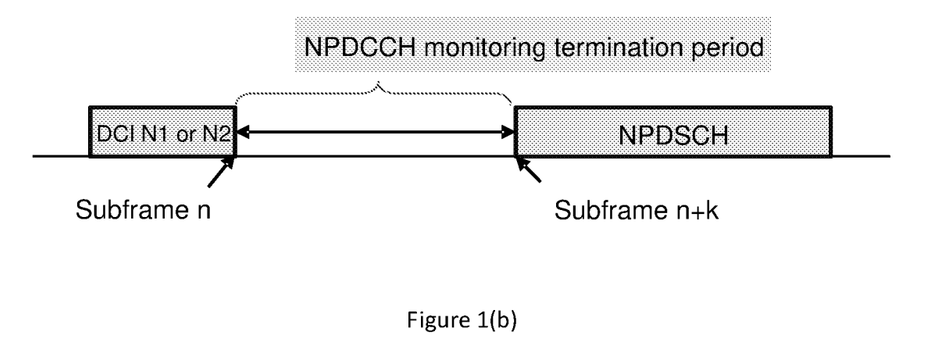
FIG. 1(b) illustrates a legacy NPDCCH monitoring termination period for DCI N1 or N2 scheduling NPDSCH transmission when maximum HARQ process number is equal to 1.

If the NB-IoT UE detects NPDCCH with DCI Format N1 or N2 ending in subframe n, and if the corresponding NPDSCH downlink transmission starts from subframe n+k, the UE is not required to monitor NPDCCH in any subframe starting from subframe n+1 to subframe n+k−1. As shown in FIG. 1(b), the UE terminates NPDCCH monitoring from subframe n+1 to subframe n+k−1. In other words, subframe n+1 to subframe n+k−1 is NPDCCH monitoring termination period, during which the UE does not monitor NPDCCH.

Figure 2A:
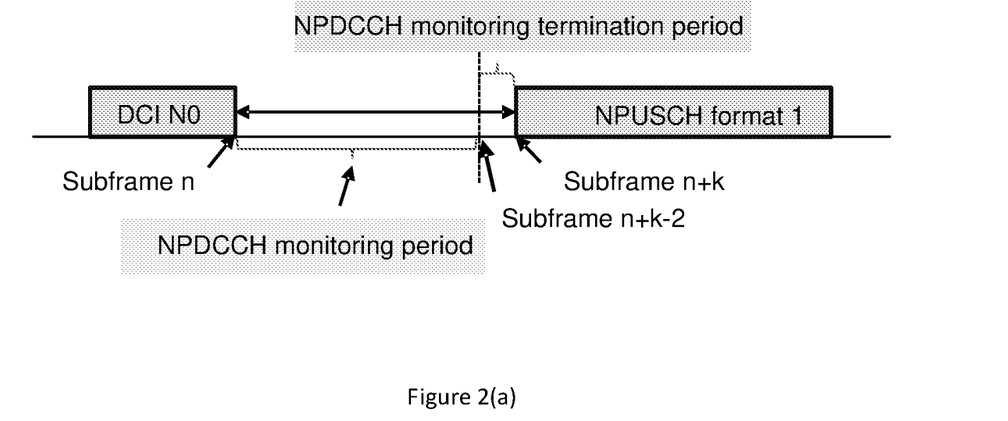
FIG. 2(a) illustrates a legacy NPDCCH monitoring termination period for DCI N0 scheduling NPUSCH transmission when maximum HARQ process number is equal to 2.

When the maximum HARQ process number is equal to 2, the NPDCCH search space constraint is described as follows:

If the NB-IoT UE detects NPDCCH with DCI N0 ending in subframe n, and if the corresponding NPUSCH format 1 transmission starts from subframe n+k, the UE is not required to monitor an NPDCCH candidate in two subframes starting from subframe n+k−2 to subframe n+k−1. When the maximum HARQ process number is equal to 2, the NBIoT UE has to monitor a second DCI N0 after receiving a first DCI N0. As shown in FIG. 2(a), if the NBIoT UE detects NPDCCH with DCI N0 (e.g. the first DCI N0) ending in subframe n, and if the corresponding NPUSCH format 1 uplink transmission starts from n+k, the UE is required to monitor an NPDCCH candidate (for the second DCI N0) in subframes starting from subframe n+1 (the next subframe of the end subframe of DCI reception) to subframe n+k−3 (three subframes before the start subframe of uplink (NPUSCH) transmission), and is not required to monitor the NPDCCH candidate in subframes starting from subframe n+k−2 to subframe n+k−1.

It can be seen that subframe n+k−2 to subframe n+k−1 is NPDCCH monitoring termination period, during which the UE does not monitor NPDCCH. The two subframes (subframe n+k−2 to subframe n+k−1) are used for DL/UL switching and TA adjustment. The UE also terminates monitoring NPDCCH during the uplink transmission. The uplink transmission subframes are known to UE and eNB.

Figure 2B:
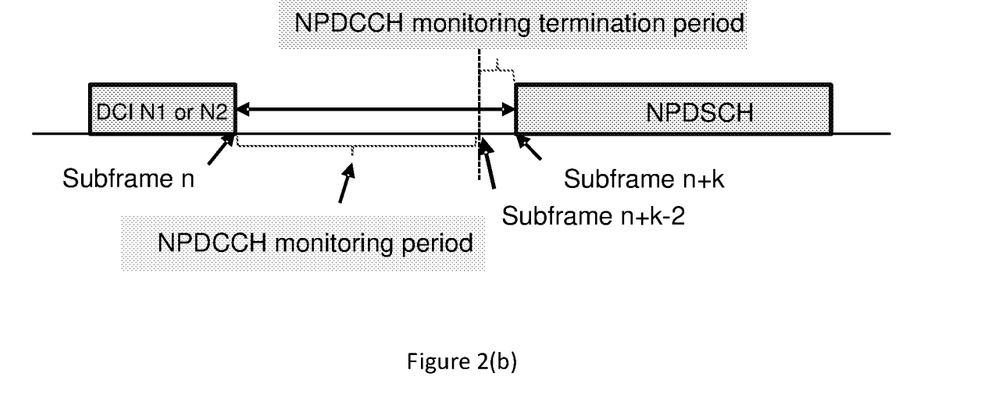
FIG. 2(b) illustrates a legacy NPDCCH monitoring termination period for DCI N1 or N2 scheduling NPDSCH transmission when maximum HARQ process number is equal to 2.

If the NB-IoT UE detects NPDCCH with DCI N1 or N2 ending in subframe n, and if the corresponding NPDSCH transmission starts from subframe n+k, the UE is not required to monitor an NPDCCH candidate in two subframes starting from subframe n+k−2 to subframe n+k−1. As shown in FIG. 2(b), the UE performs NPDCCH monitoring from subframe n+1 to subframe n+k−3 (NPDCCH monitoring period), and terminates NPDCCH monitoring from subframe n+k−2 to subframe n+k−1 (NPDCCH monitoring termination period).

Figure 3:
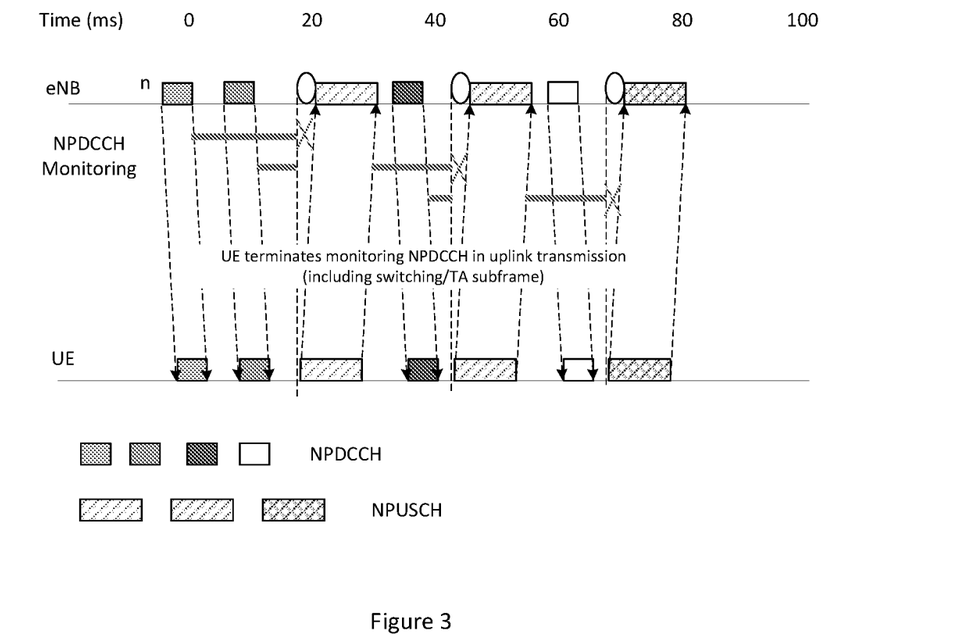
FIG. 3 illustrates an example of legacy NPDCCH search space for DCI N0 scheduling NPUSCH transmission when the maximum HARQ process number is equal to 2.

FIG. 3 illustrates an example of legacy NPDCCH search space for DCI N0 scheduling NPUSCH format 1 transmission when the maximum HARQ process number is equal to 2. The UE terminates monitoring NPDCCH during two subframes before each NPUSCH transmission. The two subframes (NPDCCH monitoring termination period) are used for TA adjustment and DL/UL switching. In particular, the TA adjustment is within one subframe, and TA adjustment and DL/UL switching can be absorbed in two subframes. The UE also terminates NPDCCH monitoring during the NPUSCH transmission.

The subframe number for DL and UL is aligned. So, the UE terminates monitoring NPDCCH during the subframes of NPUSCH as scheduled uplink subframes. For example, if the uplink transmission is scheduled in subframes 20 to 29, the UE terminates the NPDCCH monitoring in subframes 18-19 (i.e. two subframes before NPUSCH transmission), and in subframes 20-29 (NPUSCH transmission subframes).

As described above, the time slots (e.g. subframes) during which the UE terminates NPDCCH monitoring are fixed. It is not necessary to indicate to the UE the NPDCCH monitoring termination period during which the UE terminates NPDCCH monitoring.

Figure 4:
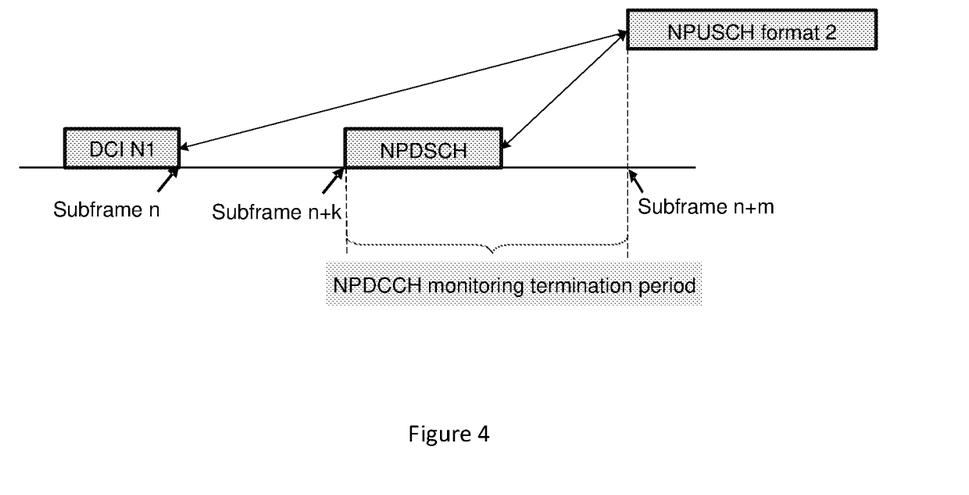
FIG. 4 illustrates a legacy NPDCCH monitoring termination period for DCI N1 or N2 scheduling NPDSCH transmission and its corresponding feedback.

In the scenario of DCI N1 scheduling NPDSCH downlink transmission, in addition to the NPDCCH monitoring termination period shown in FIG. 1(*b*) or 2(*b*), the UE also terminates monitoring NPDCCH from the start of NPDSCH transmission to the start of corresponding HARQ feedback (NPUSCH format 2) transmission. As shown in FIG. 4, if a NB-IoT UE detects NPDCCH with DCI Format N1 ending in subframe n, and if the corresponding NPDSCH transmission starts from n+k, and if the corresponding HARQ feedback (NPUSCH format 2) transmission starts from subframe n+m, the UE is not required to monitor NPDCCH in any subframe starting from subframe n+k to subframe n+m−1 (also referred to as "NPDCCH monitoring termination period"). In addition, the UE also terminates monitoring NPDCCH during the transmission of HARQ feedback (NPUSCH format 2).

The long receiver and transmitter distance (RTD) in NTN has an impact on timing relationship of NR (New Radio). An additional delay offset $K_{offset}$ can be introduced to modify relevant timing relationships. For example, for the transmission timing of DCI scheduled PUSCH (including CSI on PUSCH), the slot allocated for the PUSCH can be modified to be $$\left\lfloor n \cdot \frac{2^{\mu_{PUSCH}}}{2^{\mu_{PDCCH}}} \right\rfloor + K_s + K_{offset}.$$

For the transmission timing of RAR grant scheduled PUSCH, the UE transmits the PUSCH in time slot $n+k_2+\Delta+K_{offset}$ for the corresponding DCI in time slot n. $K_2$ is the scheduling delay indicated in DCI and $\mu_{PUSCH}$ and $\mu_{PDCCH}$ are the parameters corresponding to the subcarrier space related to the PUSCH and PDCCH. For example, for subcarrier space of PUSCH is 15 KHz, $\mu_{PUSCH}$ is equal to 1, while for subcarrier space of PDCCH is 30 KHz, $\mu_{PDCCH}$ is equal to 2.

For NBIoT in NTN, it is straightforward to introduce the additional delay offset $K_{offset}$ and apply it to modify the timing relationships (similar to NR NTN).

Figure 5:
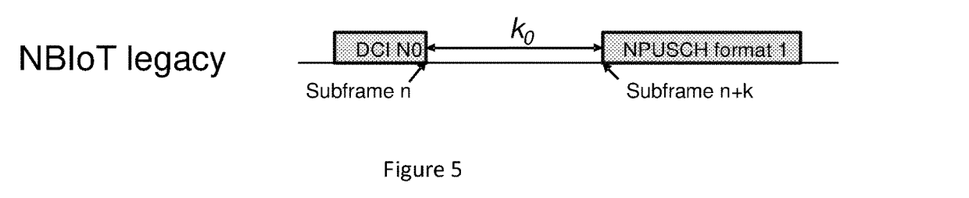
FIG. 5 illustrates a legacy scheduling delay in NBIoT.

For example, as shown in FIG. 5, for the transmission timing of DCI scheduled NPUSCH in NBIoT legacy, the UE transmits the NPUSCH from subframe $n+k_0$ (i.e. $k=k_0$). The scheduling delay ($k_0$) between the end subframe of the DCI (i.e. DCI N0) and the start subframe of the corresponding NPUSCH (i.e. NPUSCH format 1) is indicated by DCI N0. In particular, the scheduling delay ($k_0$) depends on the scheduling delay index ($I_{Delay}$) and the preconfigured maximal transmission repetitions of control signal ($R_{max}$), i.e. maximum number of repetitions of NPDCCH carrying the DCI N0, as shown in below Table 1. The scheduling delay index ($I_{Delay}$) is contained in the DCI N0. The maximal transmission repetitions of control signal ($R_{max}$) is preconfigured by higher layer.

| | $k_0$ | |
|---|---|---|
| $I_{Delay}$ | $R_{max} < 128$ | $R_{max} \geq 128$ |
| 0 | 0 | 0 |
| 1 | 4 | 16 |
| 2 | 8 | 32 |
| 3 | 12 | 64 |
| 4 | 16 | 128 |
| 5 | 32 | 256 |
| 6 | 64 | 512 |
| 7 | 128 | 1024 |

Figure 6:
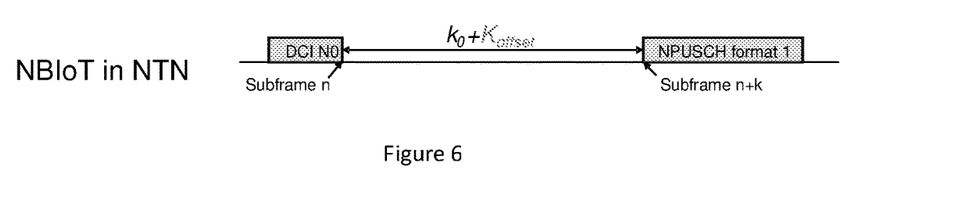
FIG. 6 illustrates an updated legacy scheduling delay in NBIoT in NTN.

On the other hand, as shown in FIG. 6, for the transmission timing of DCI scheduled NPUSCH in NBIoT in NTN, the UE may transmit the NPUSCH from subframe $n+k_0+K_{offset}$ (i.e. $k=k_0+K_{offset}$). $k_0$ is determined (or indicated) by DCI N0. An additional delay offset $K_{offset}$ is related to the round trip distance from the UE and eNB. The additional delay offset $K_{offset}$ can be configured in SIB or RRC signaling. If the UE has its location information and the earth orbit and ephemeris information, the UE can calculate the round trip delay between the eNB and the UE by itself. The earth orbit and ephemeris information indicates the position where the satellite is. In other words, the additional delay offset $K_{offset}$ can be alternatively determined by the UE itself. The value of the additional delay offset $K_{offset}$ may be determined by types of satellites. For example, if the eNB is on LEO, $K_{offset}$ can be tens of milliseconds, while if the eNB is on GEO, $K_{offset}$ can be hundreds of milliseconds.

In the condition that the maximal HARQ process number for uplink transmission (NPUSCH format 1 transmission) is configured to 2 in NBIoT in NTN, when a total scheduling delay between the DCI and the corresponding NPUSCH is extended to $k_0+K_{offset}$, the UE would continue to monitor the NPDCCH for a next DCI in the following UE specific search space, i.e. the delay period except for the subframe before the NPUSCH transmission used for DL/UL switching. However, due to long RTD in NTN, the total scheduling delay $k_0+K_{offset}$ would be quite long. Therefore, unnecessary power consumption may be present in monitoring the next DCI in the UE specific search space.

It is favorite that the eNB indicates a NPDCCH monitoring termination period, during which the UE terminates monitoring NPDCCH, to avoid unnecessary power consumption. The NPDCCH monitoring termination period is necessary to apply to all UEs within a cell. In NTN, the satellite orbital speed may be 7.5 km/s at 600 km altitude, and a minimum elevation angle on earth is approximately 10 degrees. So, the maximum delay drift between UE and satellite alone will be on the order of ±20 μs/s. It means that TA in NTN would change very fast. In addition, the UEs within a NTN cell have large TAs and large differential TAs. TA can be updated at UE side by receiving TA command (TAC) indicated from the eNB. In addition, the UE with location information and satellite ephemeris information may alternatively update the TA based on self-derived TA. In this condition, the eNB may not know the exact TA adopted at UE side. Therefore, the indication of the NPDCCH monitoring termination period should consider the above-mentioned situation.

This disclosure targets for indicating NPDCCH monitoring termination period to the UE in NTN.

BRIEF SUMMARY

Methods and apparatuses for indicating NPDCCH monitoring termination period to the UE in NTN are disclosed.

In one embodiment, a method comprises receiving a first control signal scheduling one of a first data transmission and a second data reception along with a corresponding feedback message; and terminating monitoring a second control signal in a monitoring termination period that starts from a start time slot and ends at an end time slot.

In one embodiment, the start time slot may be determined by at least one of the last time slot for receiving the first control signal (n), a first scheduling delay to the first data transmission (K1), the last time slot for receiving the second data (m) and an additional propagation delay ($K_{offset}$). The end time slot may be determined by at least one of the last time slot for receiving the first control signal (n), a first scheduling delay to the first data transmission (K1), a second scheduling delay for the second data reception (K2), the last time slot for receiving the second data (m), an additional propagation delay ($K_{offset}$), a differential propagation delay ($\Delta K$), a first time duration (L), a first data duration (M1), a second data feedback message duration (M2).

In another embodiment, when the first control signal schedules the first data transmission, the monitoring termination period starts from n+K1−1 or n+1 and ends at n+K1+L.

In some embodiment, when the first control signal schedules the second data reception along with the corresponding feedback message, the monitoring termination period starts from m+1 and ends at m+K2+L.

In another embodiment, a remote unit comprises a receiver that receives a first control signal scheduling one of a first data transmission and a second data reception along with a corresponding feedback message; and a processor that terminates monitoring a second control signal in a monitoring termination period that starts from a start time slot and ends at an end time slot.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

As described in the background part, FIG. 6 illustrates the monitoring of NPDCCH when the delay period is extended to $k_0+K_{offset}$. When the maximum HARQ number is equal to 1, the UE is not required to monitor NPDCCH in the gap period between DCI and corresponding NPUSCH transmission.

Figure 7:
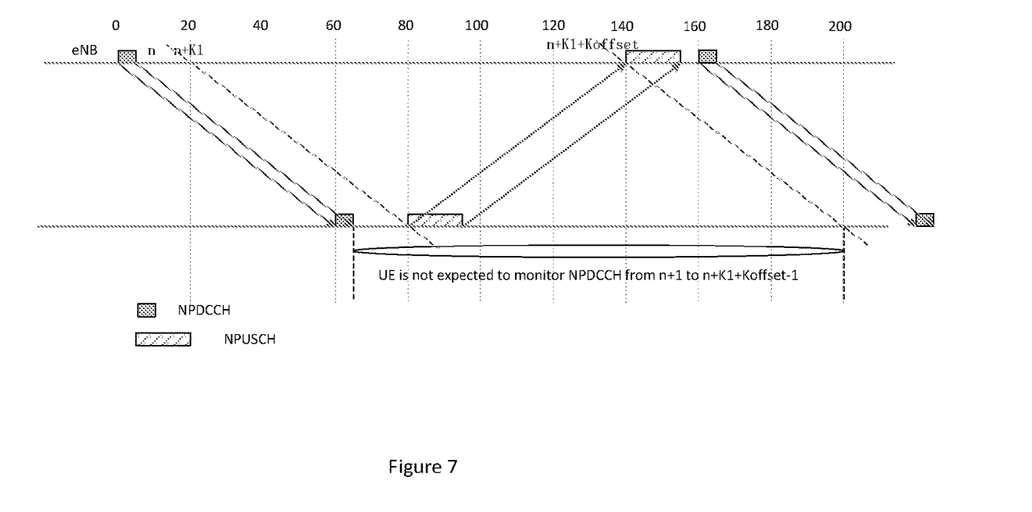
FIG. 7 illustrates an example of the first embodiment.

According to a first embodiment, because the maximum HARQ number is equal to 1, the UE is not required to monitor NPDCCH after the DCI reception until at least the completion of the NPUSCH transmission. In particular, the NPDCCH monitoring termination period is from a next subframe (n+1) of the end subframe (n) of the control signal (e.g. DCI N0) to a previous subframe (n+K1+$K_{offset}$−1) of the first scheduled subframe (n+K1+$K_{offset}$) of uplink (e.g. NPUSCH) transmission. As shown in FIG. 7, the NPDCCH monitoring termination period is from subframe n+1 to subframe n+K1. $K_{offset}$−1, where n is the end subframe of NPDCCH transmission carrying DCI N0; K1 is the scheduling delay indicated in DCI N0; an additional propaganda delay $K_{offset}$ is related to the round trip distance from the UE and eNB.

For example, if the end subframe of the control signal (e.g. DCI N0) is n=4, and the scheduled delay K1=16 and the additional propaganda delay $K_{offset}$=120, the NPUSCH transmission will start from subframe n+K1+$K_{offset}$=140. The UE is not required to monitor NPDCCH from a next subframe of the end subframe of the control signal (i.e. subframe n+1=subframe 5) to a previous subframe of the first scheduled subframe of uplink (e.g. NPUSCH) transmission (i.e. subframe n+K1+$K_{offset}$=subframe 139). In other words, the NPDCCH monitoring termination period is from subframe n+1 (e.g. subframe 5) to subframe n+K1+$K_{offset}$−1 (e.g. subframe 139).

Incidentally, the UE does not monitor NPDCCH during uplink (e.g. NPUSCH) transmission, either.

Figure 8:
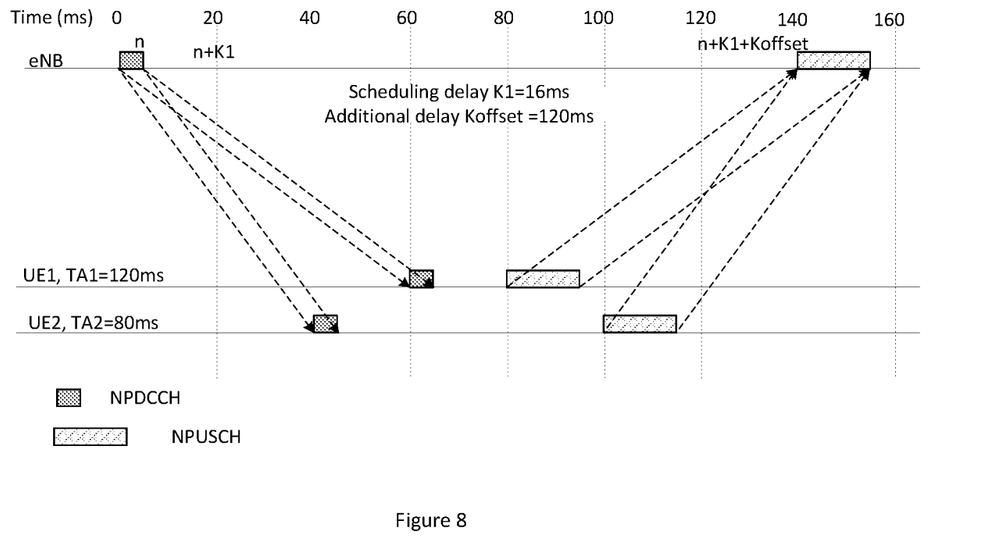
FIG. 8 illustrates problems in the prior art.

According to the second embodiment, when the maximum HARQ process number is equal to 2, the eNB shall indicate the subframes (the NPDCCH monitoring termination period) during which the UE doesn't need to monitor NPDCCH. As shown in FIG. 8, suppose the last subframe n for NPDCCH is subframe 4, the scheduling delay K1 of the uplink transmission is 16 ms, and the additional delay offset $K_{offset}$ is 120 ms, the uplink transmission would start from subframe n+K1+$K_{offset}$=140 (note that one subframe is 1 ms). The additional delay offset is cell-specific for NBIoT due to non-sensitive of delay. So, the additional delay offset $K_{offset}$ is always configured to be large enough to cover all UEs in the cell. In FIG. 8, suppose UE1 has its TA1 (e.g. the maximal TA) being equal to 120 ms while UE2 has its TA2 (e.g. the minimal TA) being equal to 80 ms, the problem is how to indicate a unified NPDCCH monitoring termination period for all UEs each having a TA that may range from the minimal TA (e.g. 80 ms) to the maximal TA (e.g. 120 ms).

As described in the background part, in NTN, the UEs within a NTN cell have large TAs and large differential TAs. In addition, when the UE derives the TA by itself, the eNB may not know the exact TA adopted at UE side, which means that DL subframe and UL subframe may not be aligned. In view of the above, according to the second embodiment, the eNB indicates the NPDCCH monitoring termination period using subframe numbers at the eNB side. The UE may determine the subframe number according to its adopted TA. In addition, the NPDCCH monitoring termination period would cover the NPUSCH transmission periods of all UEs in addition to the DL/UL switching subframe(s).

Although the eNB may not know the exact TA of each UE within a NTN cell, the eNB can determine or configure the potential maximal TA and the potential minimal TA for all UEs within the NTN cell since eNB knows exactly the coverage range of the cell. For example, the UE on the edge of the cell is assumed to have the maximal TA; and the UE that is just under the satellite is assumed to have the minimal TA. Therefore, the maximal TA and the minimal TA are known to the eNB. In this sense, the maximal TA and the minimal TA can be configured by higher layer from the eNB. The differential TA can be calculated as the maximal TA minus the minimal TA.

In NTN, the NPDCCH monitoring termination period during which the UE doesn't need to monitor NPDCCH include at least the subframes for DL/UL switching subframe(s) (for HD-FDD UE), and uplink transmission subframe(s).

According to the second embodiment, the NPDCCH monitoring termination period starts from the DL subframe corresponding to one subframe before uplink subframe for transmission, and ends at the DL subframe corresponding to the potential end subframe for transmission (for UE with the minimum TA). In particular, the NPDCCH monitoring termination period is from subframe n+K1−1 to subframe n+K1+L, in which n is the end subframe of the scheduling control signal (e.g. DCI N0), K1 is the scheduling delay indicated by the control signal, a reference period L is determined by at least one of differential TA (ΔK) and uplink transmission duration (M1), e.g. L+ΔK+M1.

The differential TA is a difference between the maximum TA and the minimal TA (i.e. the maximum TA minus the minimal TA). As mentioned earlier, the maximum TA and the minimal TA can be configured by higher layer. For example, if UE1, which is on the edge of the cell, has the maximum TA (TA1) of 120 ms, and UE2 has the minimal TA (TA2) of 80 ms, the differential TA (ΔK) is equal to 120−80=40. The uplink transmission duration (M1) is the number of subframes during which the scheduled uplink transmission transmits, and is indicated by the control signal.

Figure 9:
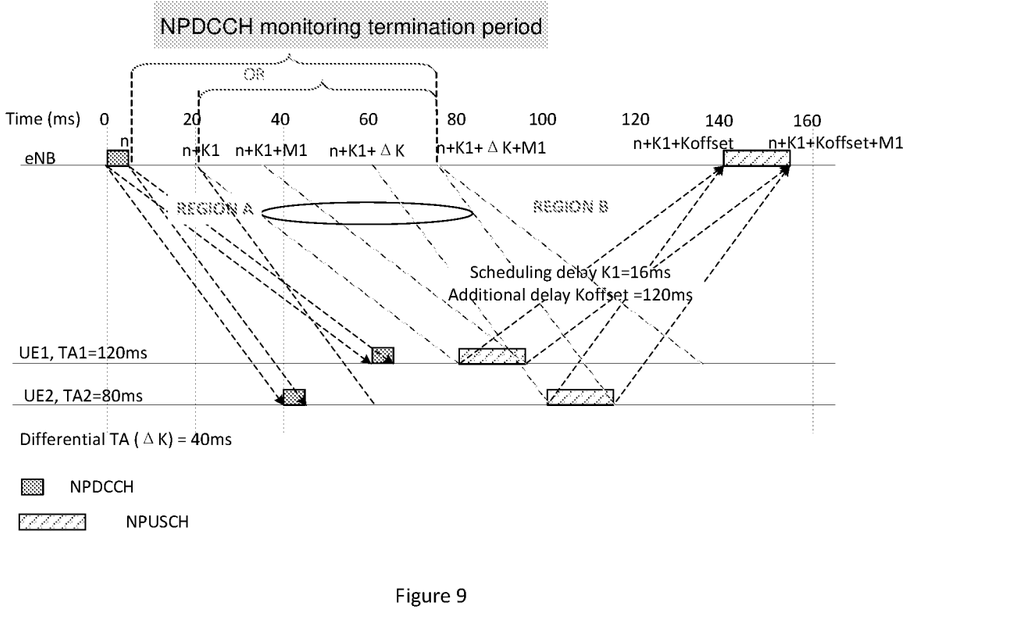
FIG. 9 illustrates an example of the second embodiment.

According to the second embodiment, subframe n+K1 represents the first subframe for NPUSCH transmission for the UE that transmits the NPUSCH transmission the earliest (that has the maximal TA) to ensure the NPUSCH transmission reaches the eNB at subframe n+K1+$K_{offset}$. For example as shown in FIG. 9, UE1, that has the maximal TA1 of 120 ms, transmits the NPUSCH transmission the earliest, i.e. if we assume TA1=$K_{offset}$, at subframe n+K1+$K_{offset}$−TA1=n+K1 so that the first subframe of the transmitted NPUSCH transmission can reach the eNB at subframe n+K1+$K_{offset}$. In addition, assume ΔK=TA1−TA2=$K_{offset}$−TA2, subframe n+K1+$K_{offset}$−TA2=n+K1+ΔK represents the first subframe for NPUSCH transmission for the UE that transmits the NPUSCH transmission the latest (that has the minimal TA) to ensure the NPUSCH transmission reaches the eNB at subframe n+K1+$K_{offset}$. For example as shown in FIG. 9, UE2, that has the minimal TA2 of 80 ms, transmits the NPUSCH transmission the latest, i.e. at subframe n+K1+ΔK so that the first subframe of the transmitted NPUSCH transmission can reach the eNB at subframe n+K1+$K_{offset}$. Therefore, the start subframe of the NPDCCH monitoring termination period starts from subframe n+K1−1, i.e. one subframe before subframe n+K1, that is the earliest subframe for NPUSCH transmission for all UEs in the serving cell (i.e. the start subframe for NPUSCH transmission for UE1 having the maximal TA), in which the one subframe is used for DL/UL switching before the NPUSCH transmission.

Subframe n+K1+M1 represents the last subframe for NPUSCH transmission for the UE that transmits the NPUSCH transmission the earliest (that has the maximal TA), while subframe n+K1+ΔK+M represents the last subframe for NPUSCH transmission for the UE that transmits the NPUSCH transmission the latest (that has the minimal TA). Therefore, the end subframe of the NPDCCH monitoring termination period ends at subframe n+K1+ΔK+M1, that is the latest end subframe for NPUSCH transmission for all UEs in the serving cell (i.e. the end subframe for NPUSCH transmission for UE2 having the minimal TA), so that the last subframe of the transmitted NPUSCH transmission can reach the eNB at subframe n+K1+$K_{offset}$+M1.

If the additional propaganda delay $K_{offset}$ is configured in a UE-specific way and TA is known by eNB, the reference period L can be determined only by uplink transmission duration M1. The eNB can configure a large enough M1 to cover the uplink transmission duration and for UE power saving consideration.

According to a variety of the second embodiment, the NPDCCH monitoring termination period may start from the next subframe of the end subframe of the control signal, i.e. from subframe n+1, instead of from n+K1−1.

As shown in FIG. 9, according to the second embodiment, the NPDCCH monitoring termination period is indicated by an elliptical circle (i.e. from subframe n+K1−1 (including one subframe for DL/UL switching that is not shown in FIG. 9) to subframe n+K1+L=n+K1+ΔK+M1). According to the variety of the second embodiment, the NPDCCH monitoring termination period is indicated by further including "REGION A", i.e. from subframe n+1 to subframe n+K1+L=n+K1+ΔK+M1. In "REGION B" (from subframe n+K1+L+1 to next potential uplink transmission), the UE is required to monitor NPDCCH.

For example, NPDCCH ends in subframe n=4, the scheduling delay (K1) is 16 ms, and the differential TA (ΔK) is 40 ms (note that one subframe is 1 ms). Suppose the uplink transmission duration (M1) is 15 ms, then the NPDCCH monitoring termination period according to the second embodiment is from subframe n+K1−1=19 to subframe n+K1+L=n+K1+ΔK+M1=75; while the NPDCCH monitoring termination period according to the variety of the second embodiment is from subframe n+1=5 to subframe n+K1+L=n+K1+ΔK+M1=75.

According to the third embodiment, when the maximum HARQ process number is equal to 2, the eNB shall indicate the subframes (i.e. NPDCCH monitoring termination period) during which the UE doesn't need to monitor NPDCCH for NPDSCH and the corresponding feedback in NPUSCH format 2.

DCI N1 transmitted in NPDCCH schedules a NPDSCH transmission and the corresponding feedback in NPUSCH format 2. n denotes the end subframe of NPDCCH transmitting DCI N1; a scheduling delay (K1) denotes the delay of the start subframe of NPDSCH transmission relative to the end subframe of NPDCCH, so the start subframe of NPDSCH transmission is subframe n+K1; m denotes the end subframe of NPDSCH transmission; a HARQ scheduling delay (K2) denotes the delay of the start subframe of NPUSCH format 2 transmission (of corresponding HARQ) relative to the end subframe of NPDSCH transmission, so the start subframe of NPUSCH format 2 transmission is subframe m+K2; M2 denotes the duration of NPUSCH format 2 transmission (of corresponding HARQ).

According to the third embodiment, the UE is not required to monitor an NPDCCH candidate in NPDCCH monitoring termination period that starts from subframe m+1 and ends at subframe m+K2+L. The reference period L is determined by at least one of differential TA (ΔK) and the duration of NPUSCH format 2 transmission (M2), e.g. L=ΔK+M2.

The differential TA is a difference between the maximum TA and minimal TA. For example, if UE1 has the maximum TA (TA1) of 120 ms, and UE2 has the minimal TA (TA2) of 80 ms, the differential TA (ΔK) is equal to 120−80=40. The duration of NPUSCH format 2 transmission (M2) is the number of subframes during which the feedback uplink transmission transmits.

Figure 10:
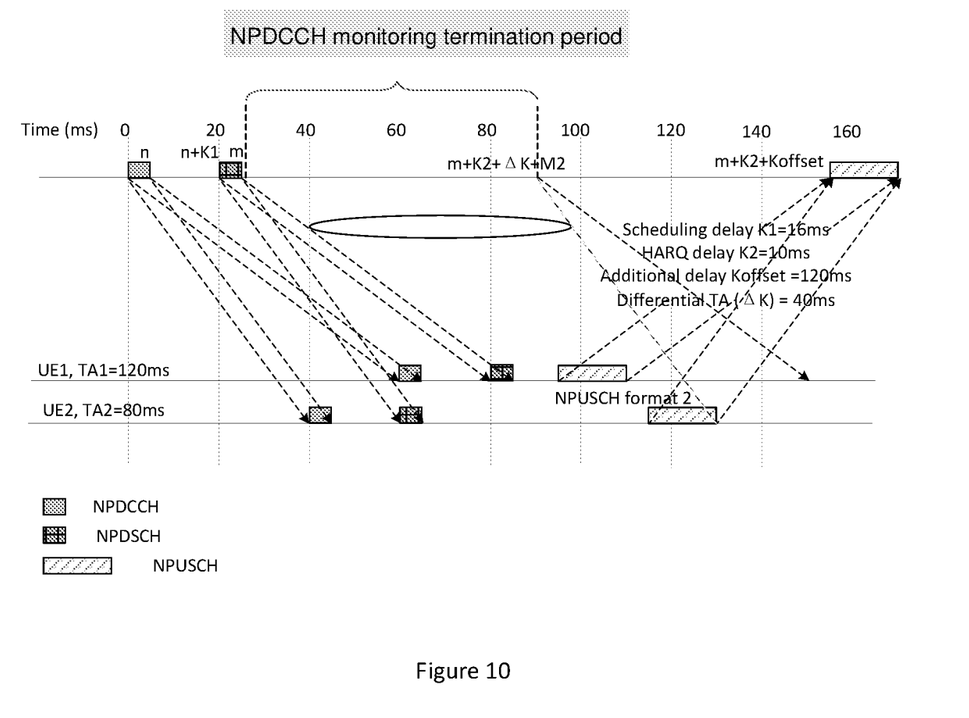
FIG. 10 illustrates an example of the third embodiment.

As shown in FIG. 10, according to the third embodiment, the NPDCCH monitoring termination period is indicated by an elliptical circle (i.e. from subframe m+1 to subframe m+K2+L=m+K2+ΔK+M2).

As shown in FIG. 10, the subframe m+1 is the next subframe of the end subframe of NPDSCH transmission for all UEs in the serving cell. The subframe m+K2+L=m+K2+ΔK+M2 is the latest DL subframe for NPUSCH format 2 transmission for all UEs in the serving cell (i.e. the end subframe for NPUSCH format 2 transmission for UE2 having the minimal TA).

For example, NPDSCH ends in subframe m=24, the HARQ scheduling delay (K2) is 10 ms, and the differential TA (ΔK) is 40 ms (note that one subframe is 1 ms). Suppose the duration of NPUSCH format 2 transmission (M2) is 15 ms, then the NPDCCH monitoring termination period according to the third embodiment is from subframe m+1=25 to subframe m+K2+L=m+K2+ΔK+M2=89.

If m+$K_{offset}$ is denoted as s, the NPDCCH monitoring termination period (from subframe m+1 to subframe m+K2+L=m+K2+ΔK+M2) can be written as from subframe s−$K_{offset}$+1 to subframe s−$K_{offset}$+K2+L=s−$K_{offset}$+K2+ΔK+M2).

Figure 11:
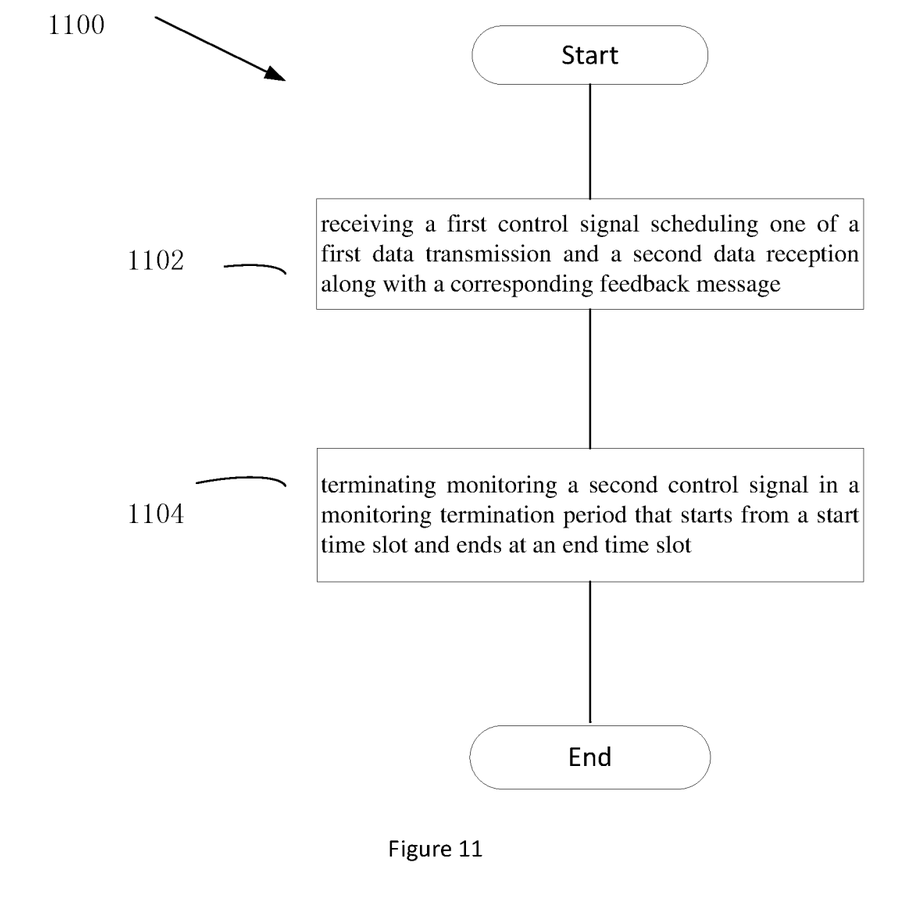
FIG. 11 is a schematic flow chart diagram illustrating an embodiment of a method.

FIG. 11 is a schematic flow chart diagram illustrating an embodiment of a method 1100 according to the present application. In some embodiments, the method 1100 is performed by an apparatus, such as a remote unit. In certain embodiments, the method 1100 may be performed by a processor executing program code, for example, a microcontroller, a microprocessor, a CPU, a GPU, an auxiliary processing unit, a FPGA, or the like.

The method 1100 may include 1102 receiving a first control signal scheduling one of a first data transmission and a second data reception along with a corresponding feedback message; and 1104 terminating monitoring a second control signal in a monitoring termination period that starts from a start time slot and ends at an end time slot.

The start time slot may be determined by at least one of the last time slot for receiving the first control signal (n), a first scheduling delay to the first data transmission (K1), the last time slot for receiving the second data (m) and an additional propagation delay ($K_{offset}$). The end time slot may be determined by at least one of the last time slot for receiving the first control signal (n), a first scheduling delay to the first data transmission (K1), a second scheduling delay for the second data reception (K2), the last time slot for receiving the second data (m), an additional propagation delay ($K_{offset}$), a differential propagation delay (ΔK), a first time duration (L), a first data duration (M1), a second data feedback message duration (M2).

When the first control signal schedules the first data transmission, the monitoring termination period starts from n+K1−1 or n+1 and ends at n+K1+L.

When the first control signal schedules the second data reception along with the corresponding feedback message, the monitoring termination period starts from m+1 and ends at m+K2+L.

Figure 12:
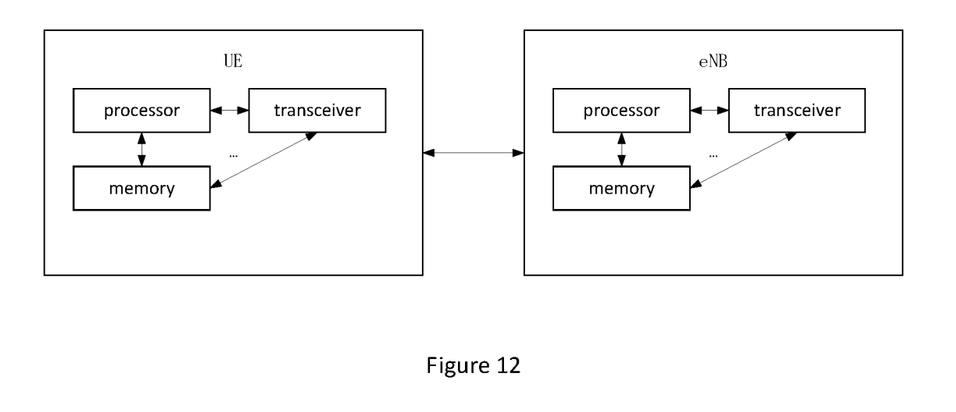
FIG. 12 is a schematic block diagram illustrating apparatuses according to one embodiment.

FIG. 12 is a schematic block diagram illustrating apparatuses according to one embodiment.

Referring to FIG. 12, the UE (i.e. the remote unit) includes a processor, a memory, and a transceiver. The processor implements a function, a process, and/or a method which are proposed in FIG. 11. The eNB (i.e. base unit) includes a processor, a memory, and a transceiver. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
   receiving a first control signal scheduling a first data transmission; and
   terminating monitoring a second control signal in a monitoring termination period that starts from a last time slot for receiving the first control signal plus a first scheduling delay to the first data transmission minus 1, or from the last time slot for receiving the first control signal plus 1, and ends at the last time slot for receiving the first control signal plus the first scheduling delay to the first data transmission plus a value determined by at least one of a differential propagation delay or a first data duration.

2. The method of claim 1, wherein a start time slot for the monitoring termination period is determined by at least one of the last time slot for receiving the first control signal, the first scheduling delay to the first data transmission or an additional propagation delay.

3. The method of claim 1, wherein an end time slot for the monitoring termination period is determined by at least one of the last time slot for receiving the first control signal, the first scheduling delay to the first data transmission, an additional propagation delay, the differential propagation delay, a first time duration, the first data duration, or a second data feedback message duration.

4. The method of claim 1, further comprising:
   receiving a third control signal scheduling a data reception along with a corresponding feedback message; and
   terminating monitoring a fourth control signal in a second monitoring termination period that starts from a last time slot for receiving the data reception plus 1 and ends at the last time slot for receiving the data reception plus a second scheduling delay for the data reception plus a value determined by at least one of a second differential propagation delay or a second data feedback message duration.

5. A user equipment (UE) for wireless communication, comprising:
   at least one memory; and
   at least one processor coupled with the at least one memory and configured to cause the UE to:
      receive a first control signal scheduling a first data transmission; and
      terminate monitoring a second control signal in a monitoring termination period that starts from a last time slot for receiving the first control signal plus a first scheduling delay to the first data transmission minus 1, or from the last time slot for receiving the first control signal plus 1, and ends at the last time slot for receiving the first control signal plus the first scheduling delay to the first data transmission plus a value determined by at least one of a differential propagation delay or a first data duration.

6. The UE of claim 5, wherein a start time slot for the monitoring termination period is determined by at least one of the last time slot for receiving the first control signal, the first scheduling delay to the first data transmission, or an additional propagation delay.

7. The UE of claim 5, wherein an end time slot for the monitoring termination period is determined by at least one of the last time slot for receiving the first control signal, the first scheduling delay to the first data transmission, an additional propagation delay, the differential propagation delay, a first time duration, the first data duration, or a second data feedback message duration.

8. The UE of claim 5, wherein the at least one processor is further configured to cause the UE to:
   receive a third control signal scheduling a data reception along with a corresponding feedback message; and
   terminate monitoring a fourth control signal in a second monitoring termination period that starts from a last time slot for receiving the data reception plus 1 and ends at the last time slot for receiving the data reception plus a second scheduling delay for the data reception plus a value determined by at least one of a second differential propagation delay or a second data feedback message duration.

9. A processor for wireless communication, comprising:
   at least one controller coupled with at least one memory and operable to cause the processor to:
      receive a first control signal scheduling a first data transmission; and terminate monitoring a second control signal in a monitoring termination period that starts from a last time slot for receiving the first control signal plus a first scheduling delay to the first data transmission minus 1, or from the last time slot for receiving the first control signal plus 1, and ends at the last time slot for receiving the first control signal plus the first scheduling delay to the first data transmission plus a value determined by at least one of a differential propagation delay or a first data duration.

10. The processor of claim 9, wherein a start time slot for the monitoring termination period is determined by at least one of the last time slot for receiving the first control signal, the first scheduling delay to the first data transmission, or an additional propagation delay.

11. The processor of claim 9, wherein an end time slot for the monitoring termination period is determined by at least one of the last time slot for receiving the first control signal, the first scheduling delay to the first data transmission, an additional propagation delay, the differential propagation delay, a first time duration, the first data duration, or a second data feedback message duration.

12. The processor of claim 9, wherein the at least one controller is further configured to cause the processor to:
receive a third control signal scheduling a data reception along with a corresponding feedback message; and
terminate monitoring a fourth control signal in a second monitoring termination period that starts from a last time slot for receiving the data reception plus 1 and ends at the last time slot for receiving the data reception plus a second scheduling delay for the data reception plus a value determined by at least one of a second differential propagation delay or a second data feedback message duration.

* * * * *